US011149578B2

(12) United States Patent
Joshi et al.

(10) Patent No.: US 11,149,578 B2
(45) Date of Patent: Oct. 19, 2021

(54) PROPULSION SYSTEM FOR AN AIRCRAFT

(71) Applicant: General Electric Company, Schenectady, NY (US)

(72) Inventors: Narendra Digamber Joshi, Niskayuna, NY (US); Michael Solomon Idelchik, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 1184 days.

(21) Appl. No.: 15/430,052

(22) Filed: Feb. 10, 2017

(65) Prior Publication Data

US 2018/0230845 A1    Aug. 16, 2018

(51) Int. Cl.
| | | |
|---|---|---|
| *F01D 15/10* | (2006.01) | |
| *B64D 27/18* | (2006.01) | |
| *B64D 27/24* | (2006.01) | |
| *F02C 7/32* | (2006.01) | |
| *F02C 6/14* | (2006.01) | |
| *F02K 3/06* | (2006.01) | |

(Continued)

(52) U.S. Cl.
CPC ............ *F01D 15/10* (2013.01); *B64D 27/02* (2013.01); *B64D 27/18* (2013.01); *B64D 27/24* (2013.01); *F02C 6/00* (2013.01); *F02C 6/14* (2013.01); *F02C 7/32* (2013.01); *F02C 7/36* (2013.01); *F02K 3/06* (2013.01); *F02K 5/00* (2013.01); *B64C 11/30* (2013.01); *B64D 2027/026* (2013.01); *F05D 2220/323* (2013.01); *F05D 2220/36* (2013.01); *F05D 2220/76* (2013.01)

(58) Field of Classification Search
CPC .............. B64D 2027/026; B64C 27/02; B64C 2027/8281; B64C 37/02
See application file for complete search history.

(56) References Cited

U.S. PATENT DOCUMENTS 2,812,912 A    11/1957  Stevens et al.
3,041,465 A     6/1962  Ayre
(Continued)

FOREIGN PATENT DOCUMENTS

GB           2489311 A     9/2012
WO     WO2010/020199 A1    2/2010
(Continued)

OTHER PUBLICATIONS

U.S. Appl. No. 15/245,257, filed Aug. 24, 2016.
(Continued)

*Primary Examiner* — Joshua J Michener
*Assistant Examiner* — Michael B. Kreiner
(74) *Attorney, Agent, or Firm* — Dority & Manning, P.A.

(57) ABSTRACT

A propulsion system for an aircraft includes a turbomachine, a primary fan, and an electric machine. The turbomachine includes a first turbine and a second turbine, with at least one of the first turbine or second turbine operably connected to the electric machine and the second turbine driving the primary fan. The propulsion system additionally includes an auxiliary propulsor assembly configured to be mounted at a location away from the turbomachine and the primary fan. The electric machine is in electrical communication with the auxiliary propulsor assembly for transferring power with the auxiliary propulsor assembly during operation of the propulsion system.

21 Claims, 9 Drawing Sheets

(51) Int. Cl.
*F02K 5/00* (2006.01)
*F02C 7/36* (2006.01)
*F02C 6/00* (2006.01)
*B64D 27/02* (2006.01)
*B64C 11/30* (2006.01)

(56) References Cited

U.S. PATENT DOCUMENTS

| | | |
|---|---|---|
| 3,286,470 A | 11/1966 | Gerlaugh |
| 3,312,448 A | 4/1967 | Hull, Jr. et al. |
| 3,844,110 A | 10/1974 | Widlansky et al. |
| 4,089,493 A | 5/1978 | Paulson |
| 4,270,408 A | 6/1981 | Wagner |
| 4,370,560 A | 1/1983 | Faulkner et al. |
| 4,605,185 A | 8/1986 | Reyes |
| 4,913,380 A | 4/1990 | Verdaman et al. |
| 5,174,109 A | 12/1992 | Lampe |
| 5,799,484 A | 9/1998 | Nims |
| 5,927,644 A | 7/1999 | Ellis et al. |
| 6,105,697 A | 8/2000 | Weaver |
| 6,169,332 B1 | 1/2001 | Taylor et al. |
| 6,545,373 B1 | 4/2003 | Andres et al. |
| 6,834,831 B2 | 12/2004 | Daggett |
| 6,976,655 B2 | 12/2005 | Thompson |
| 6,992,403 B1 | 1/2006 | Raad |
| 7,251,942 B2 | 8/2007 | Dittmar et al. |
| 7,267,300 B2 | 9/2007 | Heath et al. |
| 7,285,871 B2 | 10/2007 | Derouineau |
| 7,334,392 B2 | 2/2008 | Moniz et al. |
| 7,380,749 B2 | 6/2008 | Fucke et al. |
| 7,387,189 B2 | 6/2008 | James et al. |
| 7,417,337 B1 | 8/2008 | Suttie |
| 7,493,754 B2 | 2/2009 | Moniz et al. |
| 7,495,354 B2 | 2/2009 | Herrmann |
| 7,514,810 B2 | 4/2009 | Kern et al. |
| 7,528,499 B2 | 5/2009 | Suttie |
| 7,665,689 B2 | 2/2010 | McComb |
| 7,677,502 B2 | 3/2010 | Lawson et al. |
| 7,752,834 B2 | 7/2010 | Addis |
| 7,806,363 B2 | 10/2010 | Udall et al. |
| 7,818,969 B1 | 10/2010 | Hotto |
| 7,819,358 B2 | 10/2010 | Belleville |
| 7,905,449 B2 | 3/2011 | Cazals et al. |
| 7,926,259 B2 | 4/2011 | Orlando et al. |
| 7,952,244 B2 | 5/2011 | Colin |
| 7,958,727 B2 | 6/2011 | Arnold |
| 7,970,497 B2 | 6/2011 | Derouineau et al. |
| 7,976,273 B2 | 7/2011 | Suciu et al. |
| 8,016,228 B2 | 9/2011 | Fucke et al. |
| 8,033,094 B2 | 10/2011 | Suciu et al. |
| 8,039,983 B2 | 10/2011 | Cote et al. |
| 8,099,944 B2 | 1/2012 | Foster et al. |
| 8,109,073 B2 | 2/2012 | Foster et al. |
| 8,128,019 B2 | 3/2012 | Annati et al. |
| 8,141,360 B1 | 3/2012 | Huber |
| 8,162,254 B2 | 4/2012 | Roche |
| 8,193,761 B1 | 6/2012 | Singh |
| 8,220,739 B2 | 7/2012 | Cazals |
| 8,226,040 B2 | 7/2012 | Neto |
| 8,291,716 B2 | 10/2012 | Foster et al. |
| 8,317,126 B2 | 11/2012 | Harris et al. |
| 8,432,048 B1 | 4/2013 | Paulino |
| 8,469,306 B2 | 6/2013 | Kuhn, Jr. |
| 8,489,246 B2 | 7/2013 | Dooley |
| 8,492,920 B2 | 7/2013 | Huang et al. |
| 8,522,522 B2 | 9/2013 | Poisson |
| 8,549,833 B2 | 10/2013 | Hyde et al. |
| 8,552,575 B2 | 10/2013 | Teets et al. |
| 8,561,413 B2 | 10/2013 | Taneja |
| 8,568,938 B2 | 10/2013 | Gao et al. |
| 8,596,036 B2 | 12/2013 | Hyde et al. |
| 8,622,342 B2 | 1/2014 | Filho |
| 8,631,657 B2 | 1/2014 | Hagen et al. |
| 8,636,241 B2 | 1/2014 | Lugg et al. |
| 8,640,439 B2 | 2/2014 | Hoffjann et al. |
| 8,657,227 B1 | 2/2014 | Bayliss et al. |
| 8,672,263 B2 | 3/2014 | Stolte |
| 8,684,304 B2 | 4/2014 | Burns et al. |
| 8,692,489 B2 | 4/2014 | Maalioune |
| 8,723,349 B2 | 5/2014 | Huang et al. |
| 8,723,385 B2 | 5/2014 | Jia et al. |
| 8,742,605 B1 | 6/2014 | Wilhide et al. |
| 8,836,160 B1 | 9/2014 | Paterson et al. |
| 8,857,191 B2 | 10/2014 | Hyde et al. |
| 8,890,343 B2 | 11/2014 | Bulin et al. |
| 8,925,660 B2 | 1/2015 | Bowdich et al. |
| 8,928,166 B2 | 1/2015 | Seger et al. |
| 8,939,399 B2 | 1/2015 | Kouros et al. |
| 8,950,703 B2 | 2/2015 | Bayliss et al. |
| 8,957,539 B1 | 2/2015 | Ralston |
| 8,997,493 B2 | 4/2015 | Brust et al. |
| 8,998,580 B2 | 4/2015 | Quiroz-Hernandez |
| 9,004,849 B2 | 4/2015 | Munsell et al. |
| 9,038,398 B2 | 5/2015 | Suciu et al. |
| 9,045,996 B2 | 6/2015 | Anghel et al. |
| 9,059,440 B2 | 6/2015 | Hotto |
| 9,068,562 B1 | 6/2015 | Budica et al. |
| 9,073,632 B2 | 7/2015 | Baumann |
| 9,096,312 B2* | 8/2015 | Moxon ................. B64D 27/12 |
| 9,143,023 B1 | 9/2015 | Uskert |
| 9,190,892 B2 | 11/2015 | Anthony |
| 9,193,311 B2 | 11/2015 | Siegel et al. |
| 9,318,625 B2 | 4/2016 | Gatzke |
| 9,487,303 B2 | 11/2016 | Siegel et al. |
| 9,561,860 B2* | 2/2017 | Knapp ................. G08G 5/0052 |
| 2006/0037325 A1 | 2/2006 | Peters et al. |
| 2006/0225431 A1* | 10/2006 | Kupratis ................. F01D 15/10 |
| | | 60/791 |
| 2008/0056892 A1 | 3/2008 | Barton et al. |
| 2009/0179424 A1 | 7/2009 | Yaron |
| 2010/0038473 A1 | 2/2010 | Schneider et al. |
| 2011/0016882 A1 | 1/2011 | Woelke et al. |
| 2012/0119020 A1 | 5/2012 | Burns et al. |
| 2012/0153076 A1 | 6/2012 | Burns et al. |
| 2012/0209456 A1 | 8/2012 | Harmon et al. |
| 2012/0214605 A1 | 8/2012 | Snook et al. |
| 2013/0032215 A1 | 2/2013 | Streifinger |
| 2013/0036730 A1 | 2/2013 | Bruno et al. |
| 2013/0052005 A1 | 2/2013 | Cloft |
| 2013/0062885 A1 | 3/2013 | Taneja |
| 2013/0088019 A1 | 4/2013 | Huang et al. |
| 2013/0099065 A1 | 4/2013 | Stuhlberger |
| 2013/0139515 A1 | 6/2013 | Schlak |
| 2013/0145769 A1* | 6/2013 | Norris ..................... F02K 3/105 |
| | | 60/772 |
| 2013/0154359 A1 | 6/2013 | Huang et al. |
| 2013/0184958 A1 | 7/2013 | Dyrla et al. |
| 2013/0223974 A1* | 8/2013 | Schwarz ............... F01D 17/162 |
| | | 415/1 |
| 2013/0227950 A1 | 9/2013 | Anderson et al. |
| 2013/0251525 A1 | 9/2013 | Saiz |
| 2013/0306024 A1 | 11/2013 | Rolt |
| 2013/0310994 A1 | 11/2013 | Schroeter |
| 2013/0327014 A1 | 12/2013 | Moulebhar |
| 2014/0010652 A1 | 1/2014 | Suntharalingam et al. |
| 2014/0060995 A1 | 3/2014 | Anderson et al. |
| 2014/0084677 A1 | 3/2014 | Haillot |
| 2014/0125121 A1* | 5/2014 | Edwards ............... H02J 7/1446 |
| | | 307/9.1 |
| 2014/0151495 A1 | 6/2014 | Kuhn, Jr. |
| 2014/0245748 A1 | 9/2014 | Anghel et al. |
| 2014/0250861 A1 | 9/2014 | Eames |
| 2014/0271114 A1 | 9/2014 | Phillips et al. |
| 2014/0283519 A1 | 9/2014 | Mariotto et al. |
| 2014/0290208 A1 | 10/2014 | Rechain et al. |
| 2014/0338352 A1 | 11/2014 | Edwards et al. |
| 2014/0339371 A1 | 11/2014 | Yates et al. |
| 2014/0345281 A1 | 11/2014 | Galbraith |
| 2014/0346283 A1 | 11/2014 | Salyer |
| 2014/0367510 A1 | 12/2014 | Viala et al. |
| 2014/0367525 A1 | 12/2014 | Salyer |
| 2014/0369810 A1 | 12/2014 | Binks et al. |
| 2015/0005990 A1 | 1/2015 | Burns et al. |
| 2015/0013306 A1 | 1/2015 | Shelley |

(56) References Cited

U.S. PATENT DOCUMENTS

| | | |
|---|---|---|
| 2015/0014479 A1 | 1/2015 | Bayliss et al. |
| 2015/0028594 A1 | 1/2015 | Mariotto |
| 2015/0084558 A1 | 3/2015 | Benson et al. |
| 2015/0084561 A1 | 3/2015 | Benson et al. |
| 2015/0084565 A1 | 3/2015 | Le Peuvedic |
| 2015/0089921 A1 | 4/2015 | Rideau et al. |
| 2015/0104310 A1 | 4/2015 | Griffin |
| 2015/0113996 A1 | 4/2015 | Cai et al. |
| 2015/0115108 A1 | 4/2015 | Benson et al. |
| 2015/0148993 A1 | 5/2015 | Anton et al. |
| 2015/0151844 A1 | 6/2015 | Anton et al. |
| 2015/0151847 A1 | 6/2015 | Krug et al. |
| 2015/0159552 A1 | 6/2015 | Rodriguez et al. |
| 2015/0176530 A1* | 6/2015 | Schwarz ............ F02C 3/107 60/226.1 |
| 2015/0183522 A1 | 7/2015 | Ouellette |
| 2015/0380999 A1 | 12/2015 | Joshi et al. |
| 2016/0047304 A1* | 2/2016 | Schwarz ............ F02K 3/06 415/66 |
| 2016/0053721 A1* | 2/2016 | Fletcher ............ F02C 9/54 60/226.3 |
| 2016/0061053 A1 | 3/2016 | Thomassin |
| 2016/0084104 A1 | 3/2016 | Sheridan et al. |
| 2016/0115865 A1* | 4/2016 | Schwarz ............ F02C 3/107 60/226.1 |
| 2016/0153365 A1* | 6/2016 | Fletcher ............ F02C 9/50 60/773 |
| 2016/0181641 A1 | 6/2016 | Hoffjann et al. |
| 2016/0355272 A1 | 12/2016 | Moxon |

FOREIGN PATENT DOCUMENTS

| | | |
|---|---|---|
| WO | WO2014/072615 A1 | 5/2014 |
| WO | WO2014/123740 A1 | 8/2014 |

OTHER PUBLICATIONS http://aviationweek.com/awin/boeing-researches-alternative-propulsion-and-fuel-options, Aviation Week & Space Technology, Jun. 4, 2012.

Bradley et al., "Subsonic Ultra Green Aircraft Research, Phase II: N+4 Advanced Concept Development," NASA/CR-2012-217556, May 2012.

Simon Schramm, Damping of Torsional Interaction Effects in Power Systems, 2010.

Secunde et al., "Integrated engine-generator concept for aircraft electric secondary power", Aircraft propulsion and power, NASA Technical Reports Server (NTRS), pp. 12, Jun. 1, 1972.

Hyun Dae Kim et al., "Distributed Turboelectric Propulsion for Hybrid Wing Body Aircraft", Auxiliary systems, NASA Technical Reports Server (NTRS), Conference: London, pp. 22, Jan. 1, 2008.

\* cited by examiner

PROPULSION SYSTEM FOR AN AIRCRAFT

FIELD

The present subject matter relates generally to a propulsion system for an aircraft, and an aircraft including the same.

BACKGROUND

A conventional aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing.

Additionally, turbofan jet engines are typically designed to maintain a maximum internal operating temperature below a certain threshold when operated at ground-level conditions (i.e., when ingesting air at ambient, ground-level temperatures). However, once an aircraft reaches cruise altitudes, the turbofan jet engines are ingesting air at temperatures much lower than ambient ground-level temperatures. Accordingly, with at least certain turbofan jet engines, there is room to increase an internal operating temperature, and thus to increase an overall pressure ratio of the engine, when operating at such cruise altitudes.

Accordingly, a propulsion system that may more fully utilize an operability range of a gas turbine engine during cruise operating modes would be useful.

BRIEF DESCRIPTION

Aspects and advantages of the invention will be set forth in part in the following description, or may be obvious from the description, or may be learned through practice of the invention.

In one exemplary embodiment of the present disclosure, a propulsion system for an aircraft is provided. The propulsion system includes a gas turbine engine including a turbomachine and a primary fan. The turbomachine includes a first turbine and a second turbine, and the primary fan is driven by the second turbine. The propulsion system also includes an electric machine operable with at least one of the first turbine or the second turbine. The propulsion system additionally includes an auxiliary propulsor assembly configured to be mounted at a location away from the gas turbine engine. The electric machine is in electrical communication with the auxiliary propulsor assembly for transferring power with the auxiliary propulsor assembly.

In another exemplary embodiment of the present disclosure an aircraft is provided. The aircraft includes a first propulsion system including a gas turbine engine having a primary fan and a turbomachine, an electric generator and an auxiliary propulsor assembly. The turbomachine is drivingly connected to the electric generator, and the electric generator is electrically coupled to the auxiliary propulsor assembly for driving the auxiliary propulsor assembly. The aircraft additionally includes a second propulsion system including a gas turbine engine having a primary fan and a turbomachine, an electric generator and an auxiliary propulsor assembly. The turbomachine is drivingly connected to the electric generator, and the electric generator is electrically coupled to the auxiliary propulsor assembly for driving the auxiliary propulsor assembly.

In an exemplary aspect of the present disclosure a method for operating a propulsion system for an aircraft is provided. The propulsion system includes a gas turbine engine, an electric generator and an auxiliary propulsor assembly, the gas turbine engine drivingly connected to the electric generator and the electric generator electrically coupled to the auxiliary propulsor assembly for driving the auxiliary propulsor assembly. The method includes operating the gas turbine engine in a takeoff operating mode such that a turbomachine of the gas turbine engine defines a first overall pressure ratio and provides the auxiliary propulsor assembly with a first amount of electric power through the electric generator. The method also includes operating the gas turbine engine in a cruise operating mode such that the turbomachine of the gas turbine engine defines a second overall pressure ratio and provides the auxiliary propulsor assembly with a second amount of electric power through the electric generator. The second overall pressure ratio is greater than the first overall pressure ratio.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
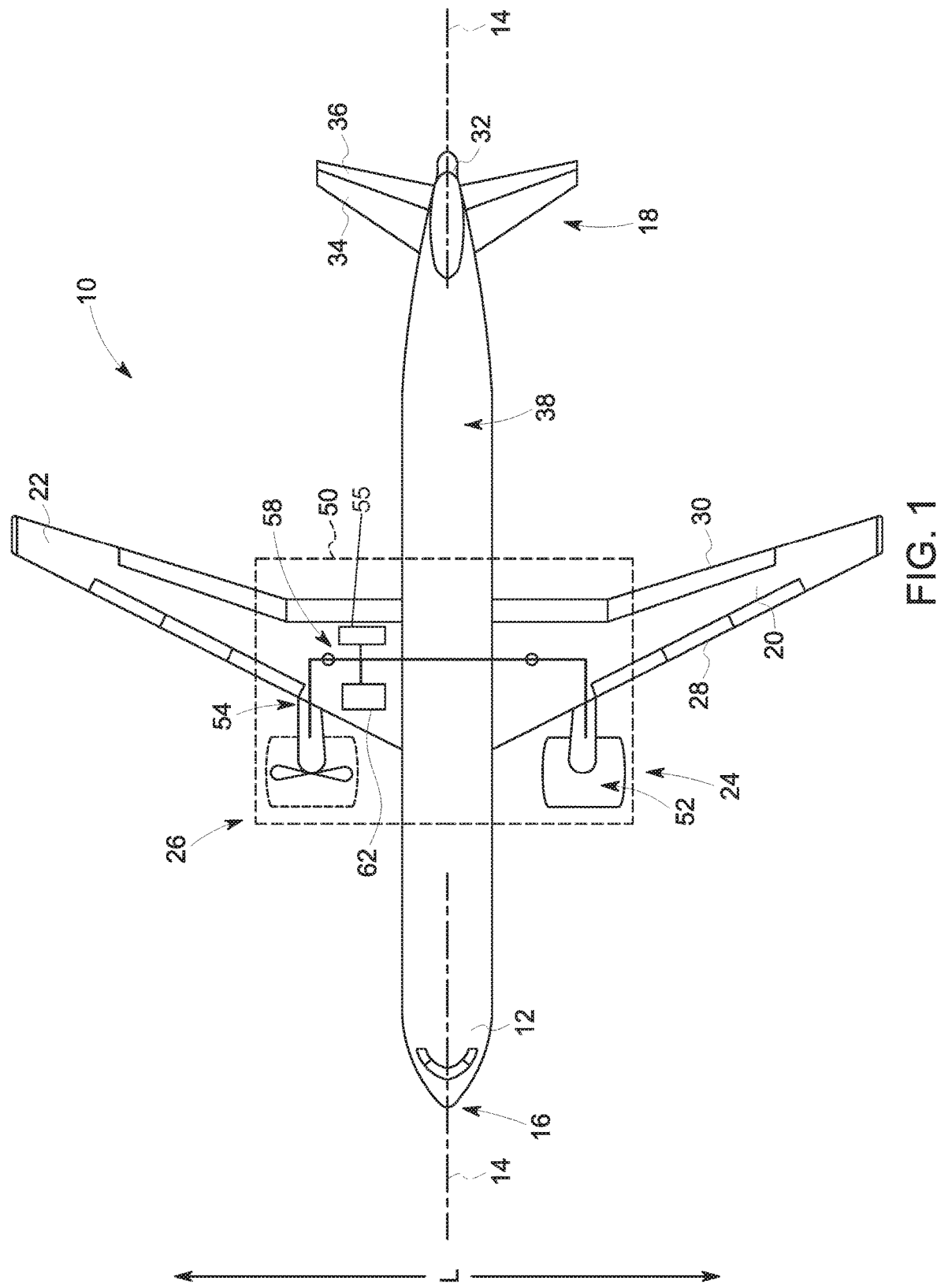
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

Referring now to the drawings, wherein identical numerals indicate the same elements throughout the figures, FIG. 1 provides a top view of an exemplary aircraft 10 as may incorporate various embodiments of the present disclosure. As shown in FIG. 1, the aircraft 10 defines a longitudinal centerline 14 that extends therethrough, a lateral direction L, a forward end 16, and an aft end 18. Moreover, the aircraft 10 includes a fuselage 12, extending longitudinally from the forward end 16 of the aircraft 10 to the aft end 18 of the aircraft 10, and a wing assembly including a port side and a starboard side. More specifically, the port side of the wing assembly is a first, port side wing 20, and the starboard side of the wing assembly is a second, starboard side wing 22. The first and second wings 20, 22 each extend laterally outward with respect to the longitudinal centerline 14. The first wing 20 and a portion of the fuselage 12 together define a first side 24 of the aircraft 10, and the second wing 22 and another portion of the fuselage 12 together define a second side 26 of the aircraft 10. For the embodiment depicted, the first side 24 of the aircraft 10 is configured as the port side of the aircraft 10, and the second side 26 of the aircraft 10 is configured as the starboard side of the aircraft 10.

Each of the wings 20, 22 for the exemplary embodiment depicted includes one or more leading edge flaps 28 and one or more trailing edge flaps 30. The aircraft 10 further includes a vertical stabilizer 32 having a rudder flap (not shown) for yaw control, and a pair of horizontal stabilizers 34, each having an elevator flap 36 for pitch control. The fuselage 12 additionally includes an outer surface or skin 38. It should be appreciated however, that in other exemplary embodiments of the present disclosure, the aircraft 10 may additionally or alternatively include any other suitable configuration. For example, in other embodiments, the aircraft 10 may include any other configuration of stabilizer.

Figure 2:
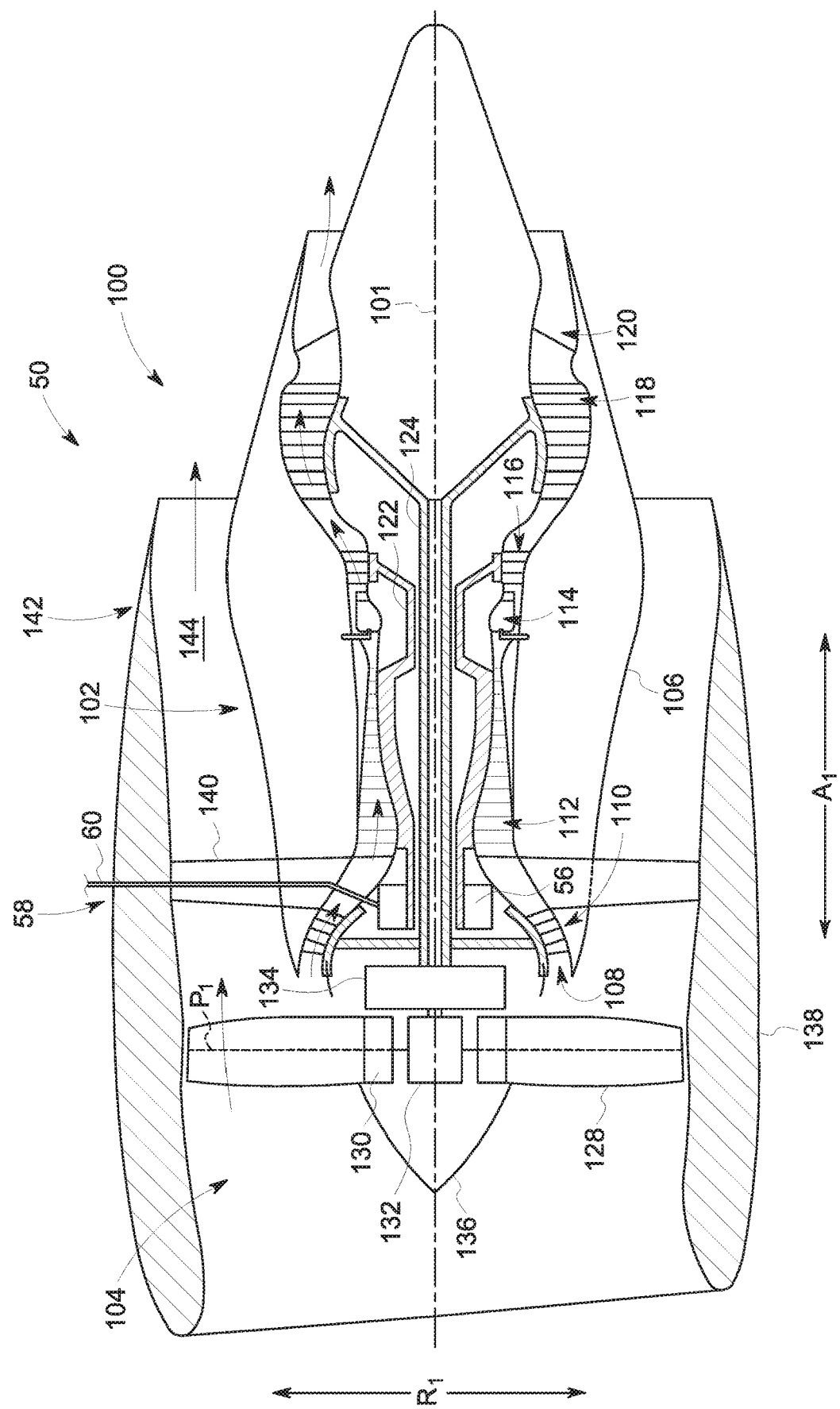
FIG. 2 is a schematic, cross-sectional view of a gas turbine engine in accordance with an exemplary embodiment of the present disclosure, which may be mounted to the exemplary aircraft of FIG. 1.
Figure 3:
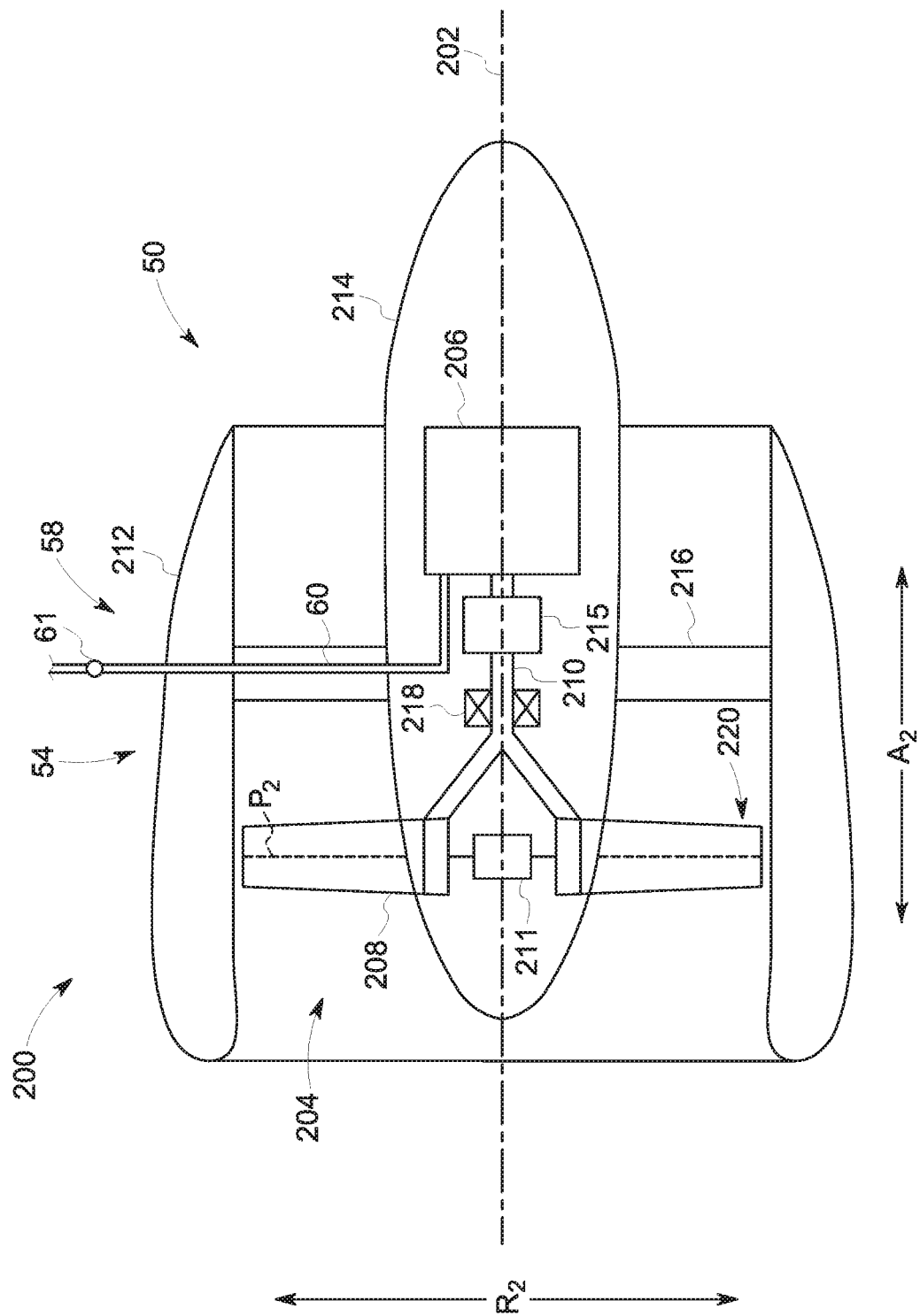
FIG. 3 is a schematic, cross-sectional view of an auxiliary propulsor assembly in accordance with an exemplary embodiment of the present disclosure, which may be mounted to the exemplary aircraft of FIG. 1.

Referring now also to FIGS. 2 and 3, the exemplary aircraft 10 of FIG. 1 additionally includes a propulsion system 50 having a first propulsor assembly 52 and a second propulsor assembly 54. FIG. 2 provides a schematic, cross-sectional view of the first propulsor assembly 52, and FIG. 3 provides a schematic, cross-sectional view of the second propulsor assembly 54. As is depicted, each of the first propulsor assembly 52 and second propulsor assembly 54 are configured as under-wing mounted propulsor assemblies.

Referring particularly to FIGS. 1 and 2, the first propulsor assembly 52 is mounted, or configured to be mounted, to the first side 24 of the aircraft 10, or more particularly, to the first wing 20 of the aircraft 10. The first propulsor assembly 52 generally includes a turbomachine and a primary fan. More specifically, for the embodiment depicted the first propulsor assembly 52 is configured as a turbofan engine 100, with the turbomachine being configured as a core turbine engine 102 and the primary fan being configured as a fan 104 operable with the core turbine engine 102.

As shown in FIG. 2, the turbofan 100 defines an axial direction $A_1$ (extending parallel to a longitudinal centerline 101 provided for reference) and a radial direction $R_1$. As stated, the turbofan 100 includes the fan 104 and the core turbine engine 102 disposed downstream from the fan 104.

The exemplary core turbine engine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, high pressure (HP) turbine 116 and a second, low pressure (LP) turbine 118; and a jet exhaust nozzle section 120.

The exemplary core turbine engine 102 of the turbofan 100 additionally includes one or more shafts rotatable with at least a portion of the turbine section and, for the embodiment depicted, at least a portion of the compressor section. More particularly, for the embodiment depicted, the turbofan 100 includes a high pressure (HP) shaft or spool 122, which drivingly connects the HP turbine 116 to the HP compressor 112. Additionally, the exemplary turbofan 100 includes a low pressure (LP) shaft or spool 124, which drivingly connects the LP turbine 118 to the LP compressor 110.

As stated, the primary fan of the first propulsor assembly 52 is configured as the fan 104 for the embodiment depicted. Further, the exemplary fan 104 depicted is configured as a variable pitch fan having a plurality of fan blades 128 coupled to a disk 130 in a spaced apart manner. The fan blades 128 extend outwardly from disk 130 generally along the radial direction $R_1$. Each fan blade 128 is rotatable relative to the disk 130 about a respective pitch axis P by virtue of the fan blades 128 being operatively coupled to a suitable actuation member 132 configured to collectively vary the pitch of the fan blades 128. The fan 104 is mechanically coupled to the LP shaft 124. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gear box 134. The power gear box 134 includes a plurality of gears for stepping down the rotational speed of the LP shaft 124 to a more efficient rotational fan speed. Accordingly, the fan 104 is powered by an LP system (including the LP turbine 118) of the core turbine engine 102.

Referring still to the exemplary embodiment of FIG. 2, the disk 130 is covered by rotatable front hub 136 aerodynamically contoured to promote an airflow through the plurality of fan blades 128. Additionally, the turbofan 100 includes an annular fan casing or outer nacelle 138 that circumferentially surrounds the fan 104 and/or at least a portion of the core turbine engine 102. Accordingly, the exemplary turbofan 100 depicted may be referred to as a "ducted" turbofan engine. It should be appreciated that the nacelle 138 is configured to be supported relative to the core turbine engine 102 by a plurality of circumferentially-spaced outlet guide vanes 140. Moreover, a downstream section 142 of the nacelle 138 extends over an outer portion of the core turbine engine 102 so as to define a bypass airflow passage 144 therebetween.

Referring still to FIG. 2, the propulsion system 50 additionally includes an electric machine, which for the embodiment depicted is configured as an electric generator 56. The electric generator 56 is, for the embodiment depicted, positioned within the core turbine engine 102 of the turbofan engine 100 and is in mechanical communication with one of the shafts of the turbofan engine 100. More specifically, for the embodiment depicted, the electric generator is driven by the first, HP turbine 116 through the HP shaft 122. The electric generator 56 is configured to convert mechanical power of the HP shaft 122 to electric power. Accordingly, the electric generator 56 is powered by an HP system (including the HP turbine 116) of the core turbine engine 102.

Referring still to FIGS. 1 and 2, the propulsion system 50 depicted additionally includes an electrical power bus 58 to allow the electric generator 56 to be in electrical communication with one or more other components of the propulsion system 50 and/or the aircraft 10. For the embodiment depicted, the electrical power bus 58 includes one or more electrical lines 60 connected to the electric generator 56, and for the embodiment depicted, extending through one or more of the outlet guide vanes 140. Additionally, the propulsion system 50 depicted further includes one or more energy storage devices 55 (such as one or more batteries or other electrical energy storage devices) electrically connected to the electrical power bus 58 for, e.g., providing electrical power to the auxiliary propulsor assembly 54 and/or receiving electrical power from the gas turbine engine/first propulsion system 52. In certain exemplary embodiments, the one or more energy storage devices 55 may be positioned proximate the auxiliary propulsor assembly 54 for weight distribution purposes. Inclusion of the one or more energy storage devices 55 may provide performance gains, and may increase a propulsion capability of the propulsion system 50 during, e.g., transient operations. More specifically, the propulsion system 50 including one or more energy storage devices 55 may be capable of responding more rapidly to speed change demands.

Figure 4:
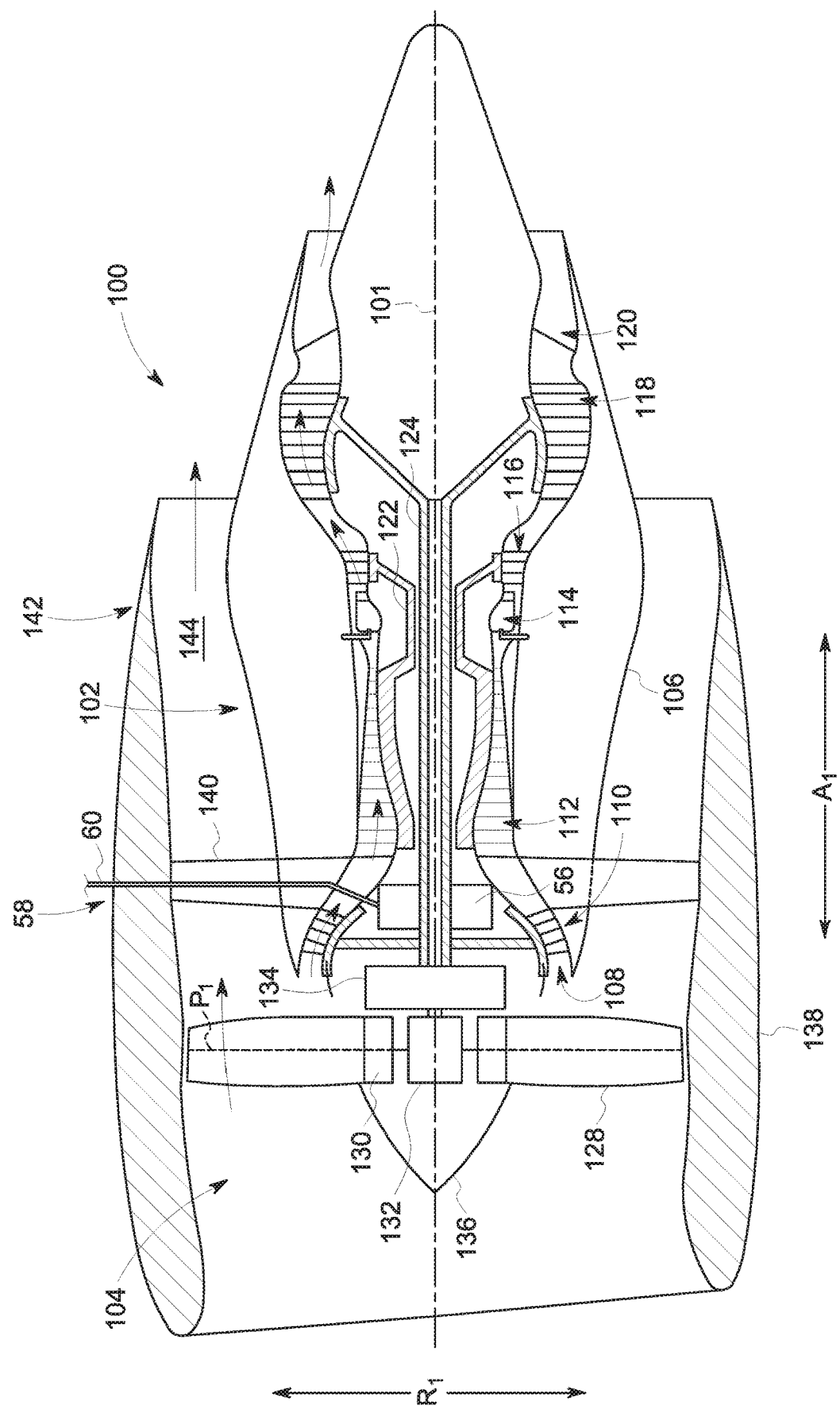
FIG. 4 is a schematic, cross-sectional view of a gas turbine engine in accordance with another exemplary embodiment of the present disclosure.

It should be appreciated, however, that in other embodiments, the electric generator 56 may be positioned in any other suitable location within the core turbine engine 102, or elsewhere. For example, the electric generator 56 may be, in other embodiments, mounted coaxially with the HP shaft 122 within the turbine section, or alternatively may be offset from the HP turbine 122 and driven through a suitable gear train. Additionally, or alternatively, the electric generator 56 may be driven by both the LP system (e.g., the LP shaft 124) and the HP system (e.g., the HP shaft 122) via a dual drive system. For example, a gear assembly, such as an epicyclic gear assembly, may be provided to allow both the LP shaft 124 and HP shaft 122 to drive the electric generator 56. Additionally, or alternatively still, in various other exemplary embodiments, the electric machine/electric generator 56 may instead be operable with just the LP system. For example, referring briefly to FIG. 4, a propulsion system 50 including a turbofan engine 100 and electric machine/electric generator 56 in accordance with another exemplary embodiment of the present disclosure is provided. The exemplary turbofan engine 100 and electric machine/electric generator 56 of FIG. 4 are configured in substantially the same manner as the exemplary turbofan engine 100 and electric machine/electric generator 56 of FIG. 2. However, for the embodiment of FIG. 4, the electric machine/electric generator 56 is instead operable with the second turbine, or rather the LP turbine 118 (i.e., the same turbine driving the fan 104 of the exemplary turbofan engine 100) via the LP shaft 124.

It should further be appreciated that the exemplary turbofan engine 100 depicted in FIG. 2 may, in other exemplary embodiments, have any other suitable configuration. For example, in other exemplary embodiments, the fan 104 may not be a variable pitch fan, and further, in other exemplary embodiments, the LP shaft 124 may be directly mechanically coupled to the fan 104 (i.e., the turbofan engine 100 may not include the gearbox 134). Further, it should be appreciated, that in other exemplary embodiments, the turbofan engine 100 may instead be configured as any other suitable aircraft engine including a turbomachine mechanically coupled to a primary fan. For example, in other embodiments, the turbofan engine 100 may instead be configured as a turboprop engine (i.e., the primary fan may be configured as a propeller), an unducted turbofan engine (i.e., the gas turbine engine may not include the outer nacelle 138), etc.

Referring now particularly to FIGS. 1 and 3, the exemplary propulsion system 50 additionally includes the second propulsor assembly 54 positioned, or configured to be positioned, at a location spaced apart from the first propulsor assembly 52 (including, e.g., the turbomachine and the primary fan). More specifically, for the embodiment depicted, the second propulsor assembly 54 is mounted at a location away from the first propulsor assembly 52 along the lateral direction L such that they ingest different airstreams along the lateral direction L. However, in other embodiments, the first and second propulsor assemblies 52, 54 may each be mounted to the aircraft 10 using a common mount. With such a configuration, however, the first and second propulsor assemblies 52, 54 may still be positioned on the mount in a manner such that they are spaced apart from one another, e.g., along the lateral direction L such that they ingest different airstreams along the lateral direction L. Referring still to the exemplary embodiment of FIGS. 1 and 3, the second propulsor assembly 54 is mounted to one of the first side 24 or second side 26 of the aircraft 10, e.g., to one of the first wing 20 or the second wing 22 of the aircraft 10. Notably, for the embodiment depicted in FIG. 1, the second propulsor assembly 54 is mounted to the second side 26 of the aircraft 10, or rather to the second wing 22 of the aircraft 10.

Referring particularly to FIG. 3, the second propulsor assembly 54 is generally configured as an auxiliary propulsor assembly 200, defining an axial direction $A_2$ extending along a longitudinal centerline axis 202 that extends therethrough for reference, as well as a radial direction $R_2$. Additionally, the auxiliary propulsor assembly 200 generally includes an auxiliary fan 204 and an electric machine, which for the embodiment depicted is configured as an electric motor 206. For the embodiment depicted, the auxiliary fan 204 is rotatable about the centerline axis 202. The auxiliary fan 204 includes a plurality of fan blades 208 and a fan shaft 210. The plurality of fan blades 208 are attached to/rotatable with the fan shaft 210 and spaced generally along a circumferential direction of the auxiliary propulsor assembly 200 (not shown).

In certain exemplary embodiments, the plurality of fan blades 208 may be attached in a fixed manner to the fan shaft 210, or alternatively, the plurality of fan blades 208 may be rotatable relative to the fan shaft 210, such as in the embodiment depicted. For example, the plurality of fan blades 208 each define a respective pitch axis P2, and are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. With such an exemplary embodiment, the fan 204 may be referred to as a variable pitch fan.

Moreover, for the embodiment depicted, the auxiliary propulsor assembly 200 depicted additionally include a fan casing or outer nacelle 212, attached to a core 214 of the auxiliary propulsor assembly 200 through one or more struts or outlet guide vanes 216. For the embodiment depicted, the outer nacelle 212 substantially completely surrounds the fan 204, and particularly the plurality of fan blades 208. Accordingly, for the embodiment depicted, the auxiliary propulsor assembly 200 may be referred to as a ducted electric fan assembly.

Notably, the fan 204 of the auxiliary propulsor assembly 200 may define a fan pressure ratio. The fan pressure ratio may generally refer to a ratio of a fan discharge pressure to a fan inlet pressure. As will be described in greater detail below, the propulsion system 50 may be operated during certain operations such that the auxiliary propulsor assembly provides relatively efficient thrust. For example, during, e.g., cruise operations of the propulsion system 50, the fan 204 of the auxiliary propulsor assembly 200 may define a fan pressure ratio of less than about 1.4:1. More specifically, in certain exemplary embodiments, the auxiliary fan 204 of the auxiliary propulsor assembly 200 may define, during cruise operations, a fan pressure ratio of less than about 1.3:1, such as less than about 1.2:1. It should be appreciated, that as used herein, terms of approximation, such as "about" or "approximately," refer to being within a 10% margin of error. Additionally, the term "cruise operations" generally refers to a level flight segment that occurs between an ascent phase and a descent phase of the flight, at which the aircraft is designed for optimum performance.

Referring still particularly to FIG. 3, the fan shaft 210 is mechanically coupled to the electric motor 206 within the core 214, such that the electric motor 206 drives the auxiliary fan 204 through the fan shaft 210. For the embodiment depicted, the electric motor 206 is configured as a variable speed electric motor, such that the electric motor 206 may drive the auxiliary fan 204 at various rotational speeds despite an amount of power provided thereto. Additionally, for the embodiment depicted, the auxiliary propulsor assembly 200 additionally includes an auxiliary propulsor gearbox 215 allowing for the rotational speed of the fan shaft 210 to be further increased or decreased relative to a rotational speed of the electric motor 206. Accordingly, for the embodiment depicted, the electric motor 206 further drives the auxiliary fan 204 across the auxiliary propulsor gearbox 215 and through the fan shaft 210.

Notably, however, in certain exemplary embodiments, the electric motor 206 may be configured as a motor/generator. Accordingly, during, e.g., emergency operations, the auxiliary propulsor assembly 200 may operate as a ram air turbine, such that inlet air to the auxiliary propulsor assembly 200 rotates the plurality of fan blades 208 of the fan 204, in turn rotating the electric motor/generator, allowing the electric motor/generator to operate as an electric generator providing electrical power to the power bus 58. Notably, with such an exemplary embodiment, the electric generator 56 of the turbofan engine 100 of FIG. 2 instead operates as an electric motor configured to receive power from the auxiliary propulsor assembly 200 and drive the core turbine engine 102. Moreover, it should be appreciated, that in other exemplary embodiments, the electric generator 56 may additionally be operable as an electric motor to receive energy from a ground (or other external) power source for e.g., starting the turbofan engine 100, and/or from an energy storage device, such as a battery, within the turbofan engine 100 or aircraft 10 for powering the turbofan engine 100.

The fan shaft 210 is supported by one or more bearings 218, such as the one or more roller bearings, ball bearings, or any other suitable bearings. Additionally, the electric motor 206 may be an inrunner electric motor (i.e., including a rotor positioned radially inward of a stator), or alternatively may be an outrunner electric motor (i.e., including a stator positioned radially inward of a rotor). As briefly noted above, the electric generator 56 of the propulsion system 50 is in electrical communication with the auxiliary propulsor assembly 200 for powering the auxiliary propulsor assembly 200. More particularly, the electric motor 206 of the auxiliary propulsor assembly 200 is in electrical communication with the electrical power bus 58, which for the embodiment depicted includes one or more electrical lines 60 electrically connected to the electric motor 206. Accordingly, the electric motor 206 is more particularly in electrical communication with the electrical power bus 58 through one or more electrical lines 60 of the electrical power bus 58, and the electrical power bus 58 may deliver power to the electric motor 206 for driving the electric motor 206, and in turn driving the fan 204. Notably, for the embodiment depicted, the electrical power bus 58 further includes one or more electrical disconnects 61, such that the electrical power bus 58 may isolate one or more components in the event of an electrical failure of one or more components. The one or more electrical disconnects 61 may be manually operated, or alternatively, may be automatically triggered in the event of an electrical failure.

Referring again briefly to FIG. 1, the propulsion system 50 depicted, or rather, the electric power bus 58 depicted, additionally includes an electric controller 62. The exemplary electric generator 56 depicted is in electrical communication with the auxiliary propulsor assembly 200 through the electric controller 62 of the electric power bus 58. The electric controller 62 may be operably connected to one or more additional controllers of the aircraft, for controlling an amount of power provided to the auxiliary propulsor assembly 200.

It should be appreciated, however, that in other embodiments, the auxiliary propulsor assembly 200 may have any other suitable configuration. For example, referring now to FIG. 5, an auxiliary propulsor assembly 200 in accordance with another exemplary embodiment of the present disclosure is depicted. The exemplary auxiliary propulsor assembly 200 of FIG. 5 may be configured in substantially the same manner as the exemplary auxiliary propulsor assembly 200 of FIG. 3, and accordingly, the same or similar numbers may refer to the same or similar part.

Figure 5:
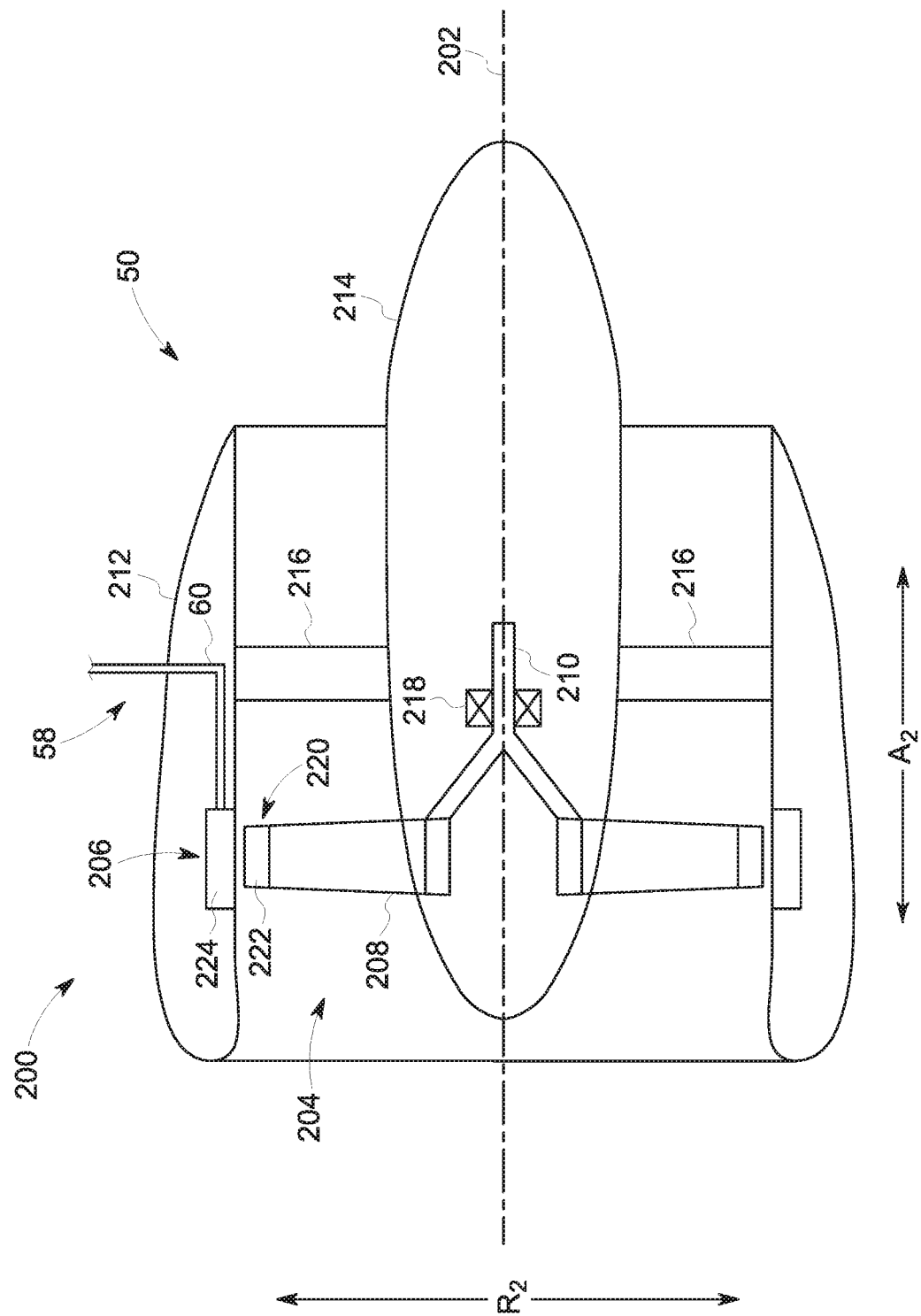
FIG. 5 is a schematic, cross-sectional view of an auxiliary propulsor assembly in accordance with another exemplary embodiment of the present disclosure.

For example, the exemplary auxiliary propulsor assembly 200 of FIG. 5 generally includes an auxiliary fan 204 including a plurality of fan blades 208 spaced generally along a circumferential direction of the auxiliary propulsor assembly 200 (not shown). Additionally, the plurality of fan blades 208 are attached to a fan shaft 210, with the fan shaft 210 supported by a one or more bearings 218. Each of the plurality of fan blades 208 includes an outer tip 220 along the radial direction R2.

Additionally, an outer nacelle 212 and an electric motor 206 are provided, with the outer nacelle 212 surrounding the auxiliary fan 204. However, for the embodiment depicted, the electric motor 206 is not configured to drive the auxiliary fan 204 through fan shaft 210. Instead, the electric motor 206 is at least partially integrated into the tips 220 of one or more of the plurality of fan blades 208 for rotating the plurality of fan blades 208 directly. More specifically, the exemplary electric motor 206 of FIG. 5 generally includes a rotor 222 and a stator 224. The rotor 222 is integrated into the tips 220 of one or more of the plurality of fan blades 208 and the stator 224 is positioned at least partially within the outer nacelle 212 of the auxiliary propulsor assembly 200. Notably, inclusion of an electric motor 206 having such a configuration may allow for an electric motor 206 having a reduced weight, which may in turn provide for additional efficiency benefits of the auxiliary propulsion assembly 200.

A propulsion system in accordance with an exemplary embodiment of the present disclosure may provide for more efficient propulsion for an aircraft. For example, typically an overall pressure ratio of a gas turbine engine is limited by a temperature limit certain components of the gas turbine engine may withstand during takeoff operations (i.e., at sea level and typical sea level ambient temperatures). However, once an aircraft incorporating such a gas turbine engine reaches cruising altitudes, the ambient temperature of air ingested by the gas turbine engine is greatly reduced. Accordingly, the temperatures within such a gas turbine engine are also greatly reduced. When the gas turbine engine is operated during cruise operations to simply provide thrust directly and through, e.g., a fan (such as in a turbofan configuration), the gas turbine engine may not be utilizing its full potential. However, with the present disclosure, energy may be extracted in certain exemplary aspects from both an LP system (through the fan) and an HP system (through an electric generator) of the gas turbine engine, requiring the engine to operate at increased overall pressure ratios, and thus increased temperatures. Specifically, extracting energy through both the LP system (i.e., through a primary fan) and the HP system (i.e., through an electric generator) requires an increased amount of energy to be generated by the turbomachine, which in turn requires an increased overall pressure ratio. Turbomachinery operating at an increased overall pressure ratio generally operates more efficiently. Notably, as discussed above, the energy extracted from the HP system may be transferred to an auxiliary fan of an auxiliary propulsor assembly to generate additional thrust relatively efficiently.

Additionally, as used herein, "overall pressure ratio" of a gas turbine engine refers to a pressure ratio of a compressor section of a turbomachine of a gas turbine engine (e.g., for the embodiment of FIG. 2 a ratio of a pressure immediately downstream of the HP compressor 112 to a pressure immediately upstream of the LP compressor). Similarly, an "overall pressure ratio" of a fan is a ratio of a pressure immediately downstream of the fan to a pressure immediately upstream of the fan.

Moreover, it should also be appreciated, that in still other exemplary embodiments, the exemplary propulsion system 50 described above with reference to FIGS. 1 through 4 may be configured in any other suitable manner. For example, in other exemplary embodiments, the fan 204 of the auxiliary propulsor assembly 200 may be mounted to a front hub of the auxiliary propulsor assembly 200. With such an embodiment, the fan shaft 210 may be drivingly connected to the hub, or alternatively, the auxiliary propulsor assembly 200 may not include the fan shaft 210, and instead the fan 204 and/or hub may be mounted directly on the electric motor 206.

Additionally, in still other embodiments, the exemplary propulsion system may be integrated into an aircraft 10 in any other suitable manner. For example, referring now to FIG. 6, an aircraft 10 in accordance with another exemplary embodiment of the present disclosure is depicted. The exemplary aircraft 10 of FIG. 6 may be configured in substantially the same manner as exemplary aircraft 10 of FIG. 1, and accordingly, the same or similar numbers may refer to same or similar part.

Figure 6:
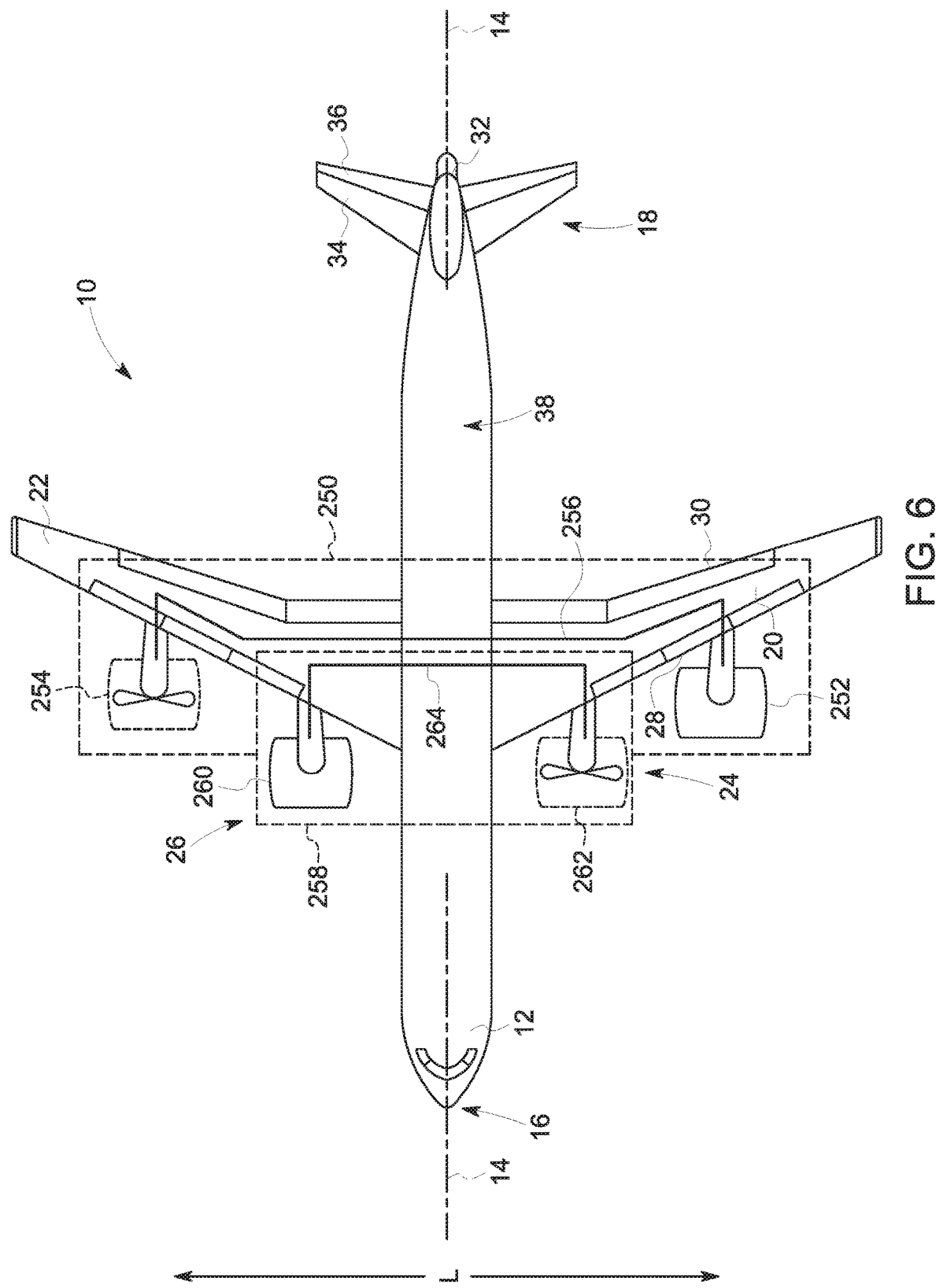
FIG. 6 is a top view of an aircraft in accordance with another exemplary embodiment of the present disclosure.

For example, the exemplary aircraft 10 of FIG. 6 generally includes a fuselage 12 and a wing assembly, the wing assembly including a port side wing 20 and a starboard side wing 22. Additionally, the exemplary aircraft 10 of FIG. 6 includes a first propulsion system 250 in accordance with an exemplary embodiment of the present disclosure. The first propulsion system 250 may be configured in substantially the same manner as exemplary propulsion system 50 described above with reference to one or more of FIGS. 1 through 4. For example, the first propulsion system 250 may include a gas turbine engine 252, an electric generator (not shown), and an auxiliary propulsor assembly 254. The gas turbine engine 252 of the first propulsion system 250 may be drivingly connected to the electric generator and the electric generator may be electrically coupled to the auxiliary propulsor assembly 254 through a first electrical power bus 256 for driving the auxiliary propulsor assembly 254. The gas turbine engine 252 of the first propulsion system 250 may generally include a primary fan and turbomachinery. For example, the gas turbine engine 252 may be configured as a turbofan engine (see FIG. 2).

However, for the embodiment depicted, the aircraft 10 further includes a second propulsion system 258, the second propulsion system 258 also configured in accordance with an exemplary embodiment of the present disclosure. For example, the second propulsion system 258 may also be configured in substantially the same manner as exemplary propulsion system 50 described above with reference to one or more of FIGS. 1 through 4. Specifically, the second propulsion system 258 may include a gas turbine engine 260, an electric generator (not shown), and an auxiliary propulsor assembly 262. The gas turbine engine 260 of the second propulsion system 258 may be drivingly connected to the electric generator and the electric generator may be electrically coupled to the auxiliary propulsor assembly 262 through a second electrical power bus 264 for driving the auxiliary propulsor assembly 262. The gas turbine engine 260 of the second propulsion system 258 may generally include a primary fan and turbomachinery. For example, the gas turbine engine 260 may be configured as a turbofan engine.

Specifically speaking, the gas turbine engine 252 of the first propulsion system 250 is mounted to the port side wing 20 and drives the auxiliary propulsor assembly 254 mounted to the starboard side wing 22. Additionally, the gas turbine engine 260 of the second propulsion system 258 is mounted to the starboard side wing 22 and drives the auxiliary propulsor assembly 262 mounted to the port side wing 20.

More generally, for the embodiment depicted, the gas turbine engine 252 of the first propulsion system 250 is mounted to one of the port side wing 20 or starboard side wing 22 and the auxiliary propulsor assembly 254 of the first propulsion system 250 is mounted to the other of the port side wing 20 or starboard side wing 22. Similarly, the gas turbine engine 260 of the second propulsion system 258 is mounted to one of the port side wing 20 or the starboard side wing 22 and the auxiliary propulsor assembly 262 of the second propulsion system 258 is mounted to the other of the port side wing 20 or the starboard side wing 22.

Specifically, for the embodiment depicted, the gas turbine engine 252 of the first propulsion system 250 is mounted to the port side wing 20 and the auxiliary propulsor assembly 254 of the first propulsion system 250 is mounted to the starboard side wing 22. By contrast, the gas turbine engine 260 of the second propulsion system 258 is mounted to the starboard side wing 22 and the auxiliary propulsor assembly 262 of the second propulsion system 258 is mounted to the port side wing 20.

An aircraft in accordance with the exemplary embodiment of FIG. 6 may provide for a more balanced aircraft from a thrust standpoint. For example, with such a configuration, if the first propulsion system 250 fails, a propulsive force from both a port side 24 of the aircraft 10 and from a starboard side 26 of the aircraft 10 is eliminated, and a propulsive force from both the port side 24 of the aircraft 10 and from the starboard side 26 of the aircraft 10 remains. The same is true if the second propulsion system 258 fails. Accordingly, elimination of one of the first propulsion system 250 or second propulsion system 258 would not result in an imbalanced propulsive force on the aircraft 10. By contrast, if the entire first propulsion system 250 were positioned on one side of the aircraft, and the entire second propulsion system 258 were positioned on the other side of the aircraft, the vertical stabilizer 32 would need to be sized such that it could offset a moment generated by substantially all of the aircraft's thrust being generated on one side of the aircraft. Notably, most current aircrafts having two propulsion sources on opposing sides of the fuselage include a relatively large vertical stabilizer 32 precisely for this purpose. Accordingly, an aircraft configured in accordance with FIG. 6 (or FIG. 7, discussed below) may allow for a reduction in size of the vertical stabilizer 32 of the aircraft 10, as in the event of a failure of one of the propulsion systems 250, 258 of the aircraft 10, the aircraft 10 still receives propulsive force from both the port and starboard sides 24, 26. Therefore, such a configuration may allow for a reduction in an amount of drag on the aircraft 10 during, e.g., cruising operations, which may result in an overall more efficient aircraft 10, providing potentially significant cost benefits.

It should be appreciated, however, that in still other exemplary embodiments, the exemplary propulsion system may be integrated into an aircraft 10 in any other suitable manner. For example, referring now to FIG. 7, an aircraft 10 in accordance with still another exemplary embodiment of the present disclosure is depicted. The exemplary aircraft 10 of FIG. 7 may be configured in substantially the same manner as exemplary aircraft 10 of FIG. 6, and accordingly, the same or similar numbers may refer to same or similar part.

Figure 7:
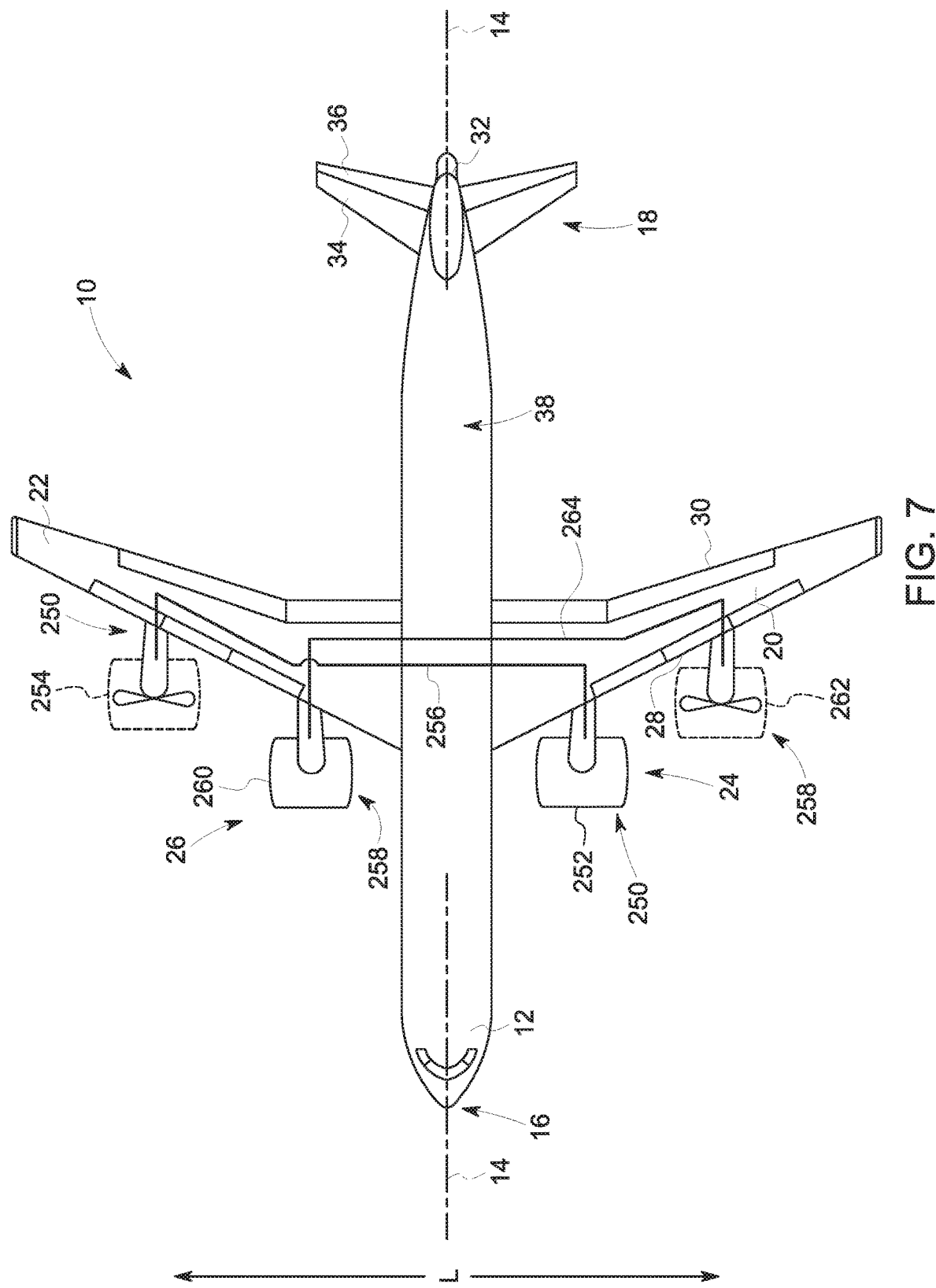
FIG. 7 is a top view of an aircraft in accordance with yet another exemplary embodiment of the present disclosure.

For example, the exemplary aircraft 10 of FIG. 7 generally includes a fuselage 12 and a wing assembly, the wing assembly including a port side wing 20 and a starboard side wing 22. Additionally, the exemplary aircraft 10 of FIG. 6 includes a first propulsion system 250 in accordance with an exemplary embodiment of the present disclosure. For example, the first propulsion system 250 includes a gas turbine engine 252, an electric generator (not shown), and an auxiliary propulsor assembly 254. The gas turbine engine 252 of the first propulsion system 250 may be drivingly connected to the electric generator and the electric generator may be electrically coupled to the auxiliary propulsor assembly 254 through a first electrical power bus 256 for driving the auxiliary propulsor assembly 254. The gas turbine engine 252 of the first propulsion system 250 may generally include a primary fan and turbomachinery. For example, the gas turbine engine 252 may be configured as a turbofan engine (see FIG. 2).

Additionally, the exemplary aircraft 10 of FIG. 7 includes a second propulsion system 258, the second propulsion system 258 also configured in accordance with an exemplary embodiment of the present disclosure. For example, the second propulsion system 258 includes a gas turbine engine 260, an electric generator (not shown), and an auxiliary propulsor assembly 262. The gas turbine engine 260 of the second propulsion system 258 may be drivingly connected to the electric generator and the electric generator may be electrically coupled to the auxiliary propulsor assembly 262 through a second electrical power bus 264 for driving the auxiliary propulsor assembly 262. The gas turbine engine 260 of the second propulsion system 258 may generally include a primary fan and turbomachinery. For example, the gas turbine engine 260 may be configured as a turbofan engine (see FIG. 2).

Moreover, as with the embodiment of FIG. 6, the exemplary gas turbine engine 252 of the first propulsion system 250 is mounted to the port side wing 20 and drives the auxiliary propulsor assembly 254 mounted to the starboard side wing 22. Additionally, the gas turbine engine 260 of the second propulsion system 258 is mounted to the starboard side wing 22 and drives the auxiliary propulsor assembly 262 mounted to the port side wing 20.

Notably, referring back briefly to FIG. 6, for the embodiment of FIG. 6, the gas turbine engine 260 of the second propulsion system 258 is positioned closer to the fuselage 12 than the auxiliary propulsor assembly 254 of the first propulsion system 250 on the starboard side wing 22. Additionally, the auxiliary propulsor assembly 262 of the second propulsion system 258 is similarly positioned closer to the fuselage 12 than the gas turbine engine 252 of the first propulsion system 250 on the port side wing 20. Similarly, referring again to FIG. 7, for the embodiment depicted, the gas turbine engine 260 of the second propulsion system 258 is positioned closer to the fuselage 12 than the auxiliary propulsor assembly 254 of the first propulsion system 250 on the starboard side wing 22. By contrast, however, for the embodiment of FIG. 7, the gas turbine engine 252 of the first propulsion system 250 is positioned closer to the fuselage 12 than the auxiliary propulsor assembly 262 of the second propulsion system 258 on the port side wing 20.

As will be appreciated, such a configuration may provide for a more equally balanced aircraft 10 (from a weight standpoint). For example, as is depicted in FIG. 7, the gas turbine engine 252 of the first propulsion system 250 and the gas turbine engine 260 of the second propulsion system 258, while positioned on opposing sides of the fuselage 12, are spaced approximately the same distance from the centerline 14 along the lateral direction L. Similarly, the auxiliary propulsor assembly 254 of the first propulsion system 250 and the auxiliary propulsor assembly 262 of the second propulsion system 258, while also positioned on opposing sides of the fuselage 12, are also spaced approximately the same distance from the centerline 14 along the lateral direction L. As it is possible that the gas turbine engines 252, 260 will weigh more than the auxiliary propulsor assemblies 254, 260, the configuration of FIG. 7 may provide for a more equally balanced (weight-wise) aircraft 10.

It should be appreciated, however, that the exemplary propulsion systems described above, and the exemplary aircraft configurations incorporating such propulsion systems described above, are provided for exemplary purposes only. In other exemplary embodiments, the propulsion systems and/or aircraft may have any other suitable configuration. For example, in other exemplary embodiments, a propulsion system in accordance with the present disclosure may include a plurality of auxiliary propulsor assemblies mounted in any suitable configuration, each driven by an electric generator of the propulsion system. Additionally, in still other embodiments, one or more of the propulsion systems may include energy storage devices (such as batteries). Further, for example, referring now to FIG. 8, a propulsion system in accordance with still another exemplary embodiment is provided. The exemplary propulsion system of FIG. 8 may be configured in substantially the same manner as the exemplary propulsion system described above with reference to FIG. 6. According, the same or similar numbers may refer to same or similar part.

Figure 8:
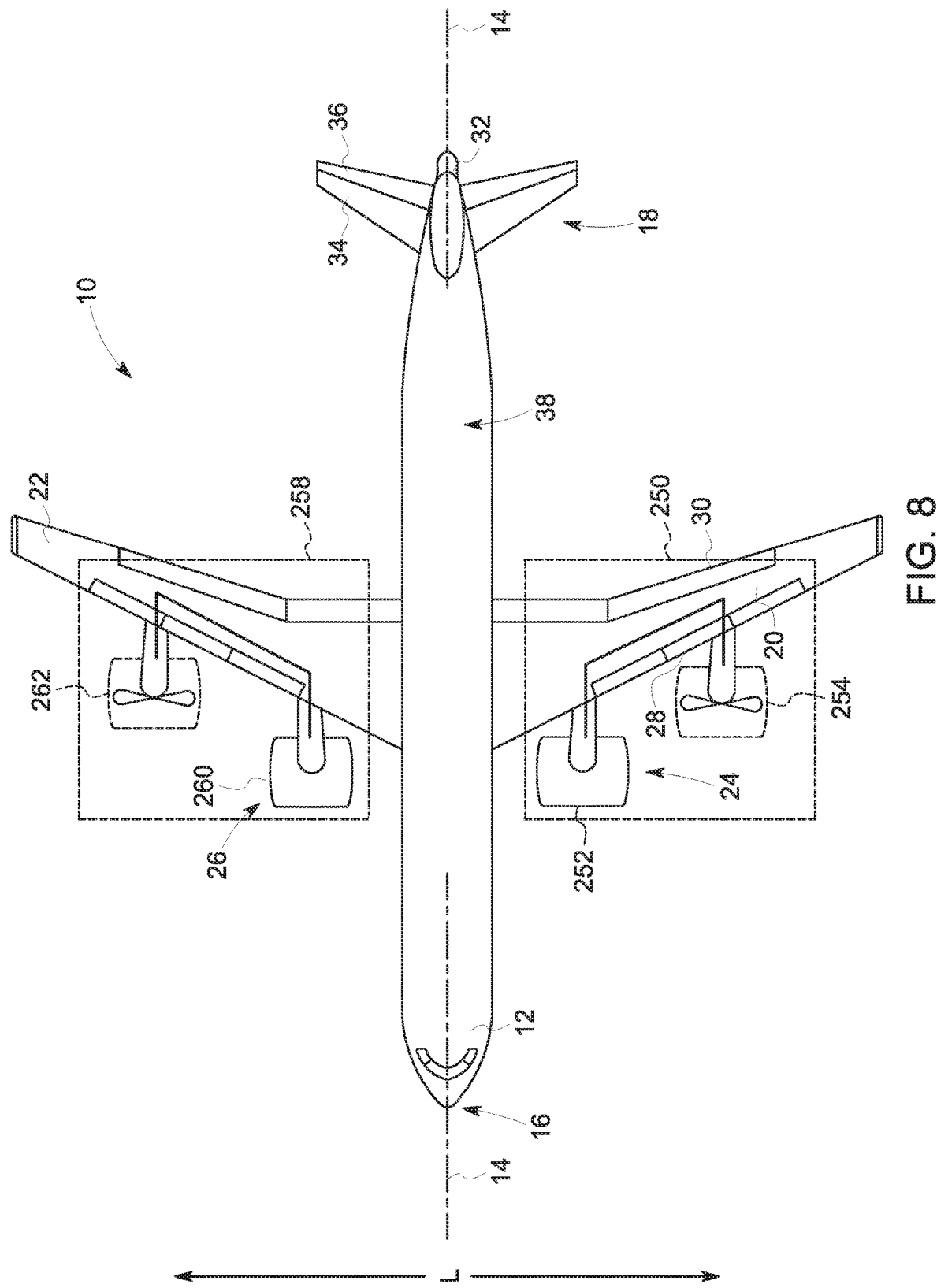
FIG. 8 is a top view of an aircraft in accordance with still another exemplary embodiment of the present disclosure.

For example, the exemplary aircraft 10 of FIG. 8 generally includes a fuselage 12 and a wing assembly, the wing assembly including a port side wing 20 and a starboard side wing 22. Additionally, the exemplary aircraft 10 of FIG. 8 includes a first propulsion system 250 in accordance with an exemplary embodiment of the present disclosure. For example, the first propulsion system 250 includes a gas turbine engine 252, an electric generator (not shown), and an auxiliary propulsor assembly 254. Additionally, the exemplary aircraft 10 of FIG. 8 includes a second propulsion system 258, the second propulsion system 258 also configured in accordance with an exemplary embodiment of the present disclosure. For example, the second propulsion system 258 includes a gas turbine engine 260, an electric generator (not shown), and an auxiliary propulsor assembly 262.

However, for the exemplary embodiment of FIG. 8, the first propulsion system 250, including the gas turbine engine 252 and auxiliary propulsor assembly 254, is mounted to the port side wing 20. Additionally, for the embodiment of FIG. 8, the second propulsion system 258, including the gas turbine engine 260 and the auxiliary propulsor assembly 262, is mounted to the starboard side wing 22. Notably, for the embodiment depicted, the gas turbine engines 252, 260 of the first and second propulsion systems 250, 258 are each mounted closer to a longitudinal centerline 14 of the aircraft 10 relative to the respective auxiliary propulsor assemblies 254, 262 of the first and second propulsion systems 250, 258. However, in other embodiments, the auxiliary propulsor assemblies 254, 262 may instead be mounted closer to the longitudinal centerline 14 of the aircraft 10.

Additionally, in still other exemplary embodiments of the present disclosure, the propulsion systems, and the aircraft incorporating such propulsion systems, may be configured in still other suitable manners. For example, in still other exemplary embodiments, one or both of a gas turbine engine and an auxiliary propulsor assembly of a propulsion system may be mounted to a fuselage of the aircraft proximate a tail end of the aircraft. For example, the propulsion system may include the gas turbine engine mounted to one side of the fuselage and the auxiliary propulsor assembly mounted to an opposite side of the fuselage (e.g., the gas turbine engine mounted to one of a starboard side 26 or port side 24 of a fuselage 12 of an aircraft 10 proximate a tail end 18, and the auxiliary propulsor assembly mounted to the other of the starboard side 26 or port side 24 of the fuselage 12 of the aircraft 10 proximate the tail end 18). Moreover, in still other exemplary embodiments, one or both of the gas turbine engine and the auxiliary propulsor assembly of the propulsion system may be mounted to a stabilizer of the aircraft, such as to a vertical stabilizer of the aircraft. In either of these embodiments, the propulsion systems may further include one of the gas turbine engine or auxiliary propulsor assembly mounted in an under-wing configuration as well.

Figure 9:
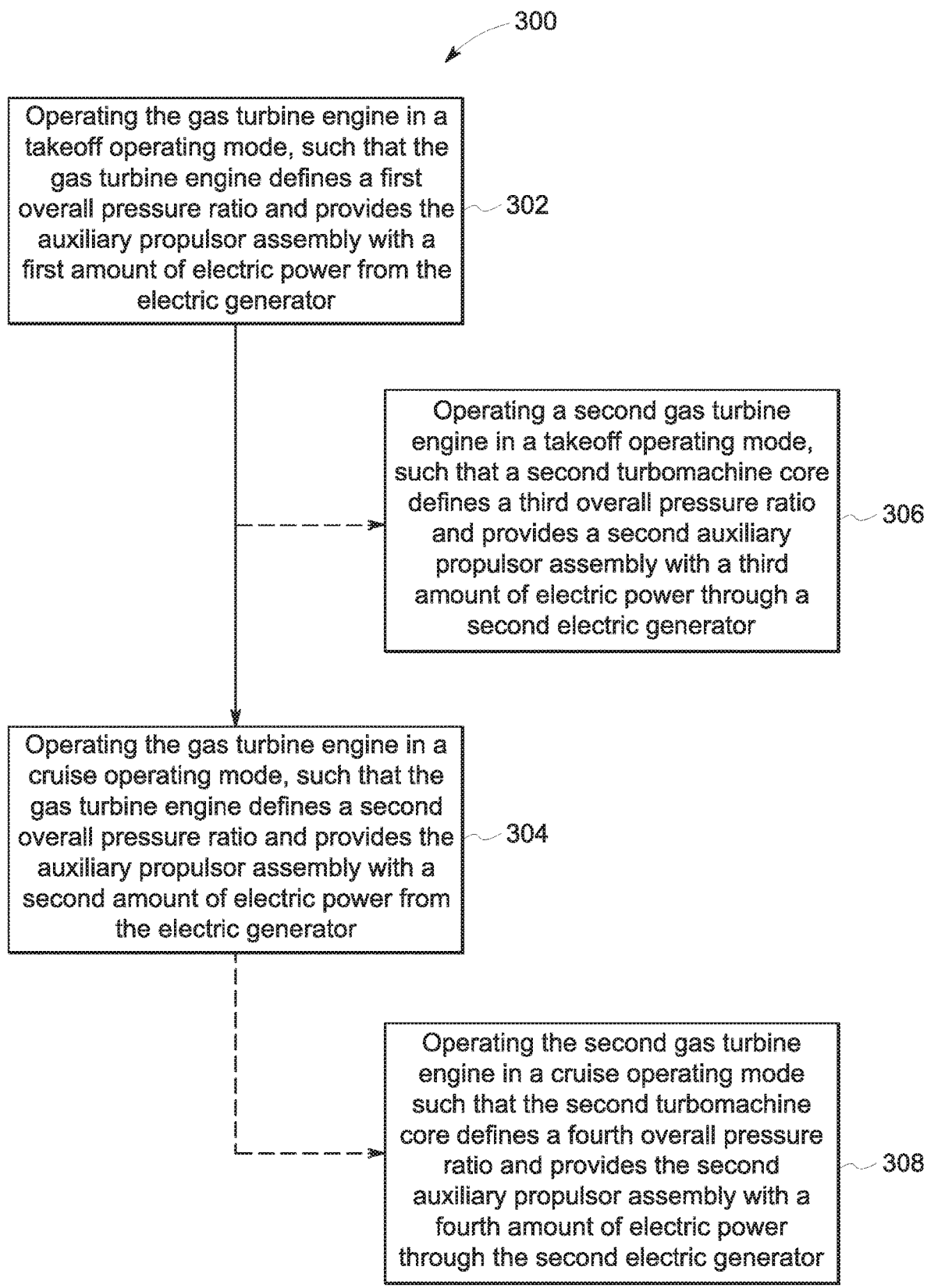
FIG. 9 is a flow diagram of a method for operating a propulsion system of an aircraft.

Referring now to FIG. 9, a flow diagram of a method (300) for operating a propulsion system of an aircraft is provided. The exemplary method (300) may be utilized with one or more embodiments of the exemplary propulsion systems and aircraft described above with reference to FIGS. 1 through 8. For example, the exemplary method (300) may be utilized with a propulsion system including a gas turbine engine, an electric generator, and an auxiliary propulsor assembly. The gas turbine engine may include a primary fan and a turbomachine, and further may drivingly be connected to the electric generator. Additionally, the electric generator may be electrically coupled to the auxiliary propulsor assembly for driving the auxiliary propulsor assembly.

For the exemplary aspect depicted, the exemplary method (300) includes at (302) operating the gas turbine engine in a takeoff operating mode, such that the turbomachine defines a first overall pressure ratio and provides the auxiliary propulsor assembly with a first amount of electric power from the electric generator. Additionally, at (304) the method (300) includes operating the gas turbine engine in a cruise operating mode, such that the turbomachine defines a second overall pressure ratio and provides the auxiliary propulsor assembly with a second amount of electric power from the electric generator.

For the exemplary aspect depicted, the second overall pressure ratio defined by the turbomachine of the gas turbine engine at (304) is greater than the first overall pressure ratio defined by the turbomachine of the gas turbine engine at (302). More specifically, in at least certain exemplary aspects, the second overall pressure ratio may be at least about 5% greater, at least about 10% greater, or at least about 20% greater than the first overall pressure ratio. Further, in at least certain exemplary aspects, the second amount of power provided to the auxiliary propulsor assembly at (304) may be substantially equal to the first amount of power provided to the auxiliary propulsor assembly at (302). Accordingly, the method 300 may include providing a substantially constant amount of power to the auxiliary propulsor assembly during takeoff and cruise. For example, in certain exemplary aspects, the method 300 may include providing a substantially constant amount of power to the auxiliary propulsor throughout a flight envelope.

As will be appreciated, an inlet air temperature and density for the turbomachine of the gas turbine engine during takeoff operating conditions is generally higher than an inlet air temperature and density for the turbomachine of the gas turbine engine during cruise operating conditions. Such allows for the turbomachine of the gas turbine engine to produce more power during takeoff as compared to during cruise. Accordingly, providing a substantially constant amount of power to the auxiliary propulsor during takeoff and cruise operating conditions results in a smaller fraction of power extraction at takeoff as compared to the relatively larger fraction of power extraction at cruise. The fraction of power extraction refers to a ratio of power provided to the auxiliary propulsor from the turbomachine to a total amount of power generated by the turbomachine.

The relatively larger fraction of power extraction at cruise is accomplished, at least in part, by increasing a core speed of the turbomachine, and accordingly increasing an overall pressure ratio of the turbomachine. Notably, a decreased inlet air temperature allows for the increase in overall pressure ratio of the turbomachine during cruise operations. For example, the turbomachine is typically operated to a maximum compressor discharge temperature and/or exhaust temperature. By reducing an inlet air temperature, a greater pressure increase is allowed across a compressor section of the turbomachine, while maintaining the compressor discharge temperature and/or exhaust temperature at or below the maximum compressor discharge temperature and/or exhaust temperature.

Further, it will be appreciated, that by increasing the core speed and overall pressure ratio of the turbomachine during cruise operations, an increased marginal fuel efficiency is accomplished for the turbomachine of the gas turbine engine. For example, the energy extracted by the generator of the propulsion system drives the auxiliary propulsor, effectively increasing an overall bypass ratio of the gas turbine engine, and thus increasing its overall propulsive efficiency, while simultaneously increasing the turbomachine efficiency due to the higher overall core speed and overall pressure ratio of the turbomachine.

Additionally, as is depicted schematically in FIG. 9, in certain exemplary aspects of the present disclosure, the propulsion system described above with reference to (302) and (304) may be a first propulsion system and the aircraft may further include a second propulsion system. The second propulsion system may include a second gas turbine engine, a second electric generator, and a second auxiliary propulsor assembly. The second gas turbine engine may include a second primary fan and second a turbomachine, and further may drivingly be connected to the second electric generator. Additionally, the second electric generator may be electrically coupled to the second auxiliary propulsor assembly for driving the second auxiliary propulsor assembly.

With such an exemplary aspect, the method (300) may further include at (306) operating the second gas turbine engine of the second propulsion system in a takeoff operating mode such that the second turbomachine of the second gas turbine engine defines a third overall pressure ratio and provides the second auxiliary propulsor assembly of the second propulsion system with a third amount of electric power through the second electric generator of the second propulsion system. Moreover, the method (300) may further include at (308) operating the second gas turbine engine in a cruise operating mode such that the second turbomachine of the second gas turbine engine defines a fourth overall pressure ratio and provides the second auxiliary propulsor assembly with a fourth amount of electric power through the second electric generator. The fourth overall pressure ratio may be greater than the third overall pressure ratio (such as at least about 5% greater), and in certain exemplary aspects, the fourth amount of electric power may be substantially equal to the third amount of electric power.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A propulsion system for an aircraft, the propulsion system comprising:
   a gas turbine engine comprising a turbomachine and a primary fan, the turbomachine comprising a first turbine and a second turbine, and the primary fan driven by the second turbine;
   an electric machine operable with at least one of the first turbine or the second turbine; and
   an auxiliary propulsor assembly configured to be positioned at a location spaced apart from the gas turbine engine, the electric machine in electrical communication with the auxiliary propulsor assembly for transferring power with the auxiliary propulsor assembly,
   wherein the propulsion system is configured to have a first fraction of power extraction when the gas turbine engine is in a takeoff operating mode and a second fraction of power extraction when the gas turbine engine is in a cruise operating mode, the first and second fraction of power extraction each being a ratio of power provided to the auxiliary propulsor assembly from the turbomachine to an overall amount of power generated by the turbomachine,
   wherein the first fraction of power extraction is less than the second fraction of power extraction.

2. The propulsion system of claim 1, wherein the electric machine is an electric generator driven by the first turbine, and wherein the electric machine is in electrical communication with the auxiliary propulsor assembly for powering the auxiliary propulsor assembly.

3. The propulsion system of claim 1, further comprising: an electric power bus, wherein the electric machine is in electrical communication with the auxiliary propulsor assembly through the electric power bus.

4. The propulsion system of claim 3, wherein the electrical power bus comprises one or more electrical disconnects for isolating electrical failures of the propulsion system.

5. The propulsion system of claim 1, wherein the auxiliary propulsor assembly comprises an electric motor and an auxiliary fan, wherein the electric motor is in electrical communication with the electric machine and drives the auxiliary fan.

6. The propulsion system of claim 5, wherein the auxiliary propulsor assembly further comprises a nacelle surrounding the auxiliary fan, wherein the auxiliary fan comprises a plurality of fan blades having outer tips, wherein the electric motor comprises a rotor and a stator, and wherein the rotor is attached to or integrated into the outer tips of the plurality of fan blades.

7. The propulsion system of claim 5, wherein the auxiliary propulsor assembly further comprises a fan shaft, wherein the electric motor drives the auxiliary fan through the fan shaft.

8. The propulsion system of claim 5, wherein the auxiliary propulsor assembly further comprises a gearbox.

9. The propulsion system of claim 5, wherein the electric motor is a variable speed motor.

10. The propulsion system of claim 1, wherein the electric machine is operable as an electric motor configured to receive power from the auxiliary propulsor assembly.

11. The propulsion system of claim 1, wherein the auxiliary propulsor assembly comprises an auxiliary fan, and wherein the auxiliary fan is configured as a variable pitch fan.

12. The propulsion system of claim 1, wherein the electric machine is an electric generator driven by the second turbine.

13. The propulsion system of claim 1, wherein the auxiliary propulsor assembly comprises an auxiliary fan, and wherein the auxiliary fan defines a fan pressure ratio during cruise operations less than about 1.4:1.

14. An aircraft comprising:
   a first propulsion system comprising a gas turbine engine having a primary fan and a turbomachine, an electric generator, and an auxiliary propulsor assembly, the turbomachine drivingly connected to the electric generator, and the electric generator electrically coupled to the auxiliary propulsor assembly for driving the auxiliary propulsor assembly; and
   a second propulsion system comprising a gas turbine engine having a primary fan and a turbomachine, an electric generator, and an auxiliary propulsor assembly, the turbomachine drivingly connected to the electric generator, and the electric generator electrically coupled to the auxiliary propulsor assembly for driving the auxiliary propulsor assembly, wherein the auxiliary propulsor assembly of the first propulsion system and the auxiliary propulsor assembly of the second propulsion system each comprise an auxiliary fan,
   wherein the first propulsion system is configured to have a first fraction of power extraction when the gas turbine engine is in a takeoff operating mode and a second fraction of power extraction when the gas turbine engine is in a cruise operating mode, the first and second fraction of power extraction each being a ratio of power provided to the auxiliary propulsor assembly from the turbomachine to an overall amount of power generated by the turbomachine, wherein the first fraction of power extraction is less than the second fraction of power extraction.

15. The aircraft of claim 14, further comprising: a wing assembly comprising a port side and a starboard side; wherein the gas turbine engine of the first propulsion system is mounted to one of the port side or starboard side of the wing assembly and wherein the auxiliary propulsor assembly of the first propulsion system is mounted to the other of the port side or starboard side of the wing assembly; and wherein the gas turbine engine of the second propulsion system is mounted to one of the port side or starboard side of the wing assembly and wherein the auxiliary propulsor assembly of the second propulsion system is mounted to the other of the port side or starboard side of the wing assembly.

16. The aircraft of claim 15, wherein the aircraft defines a longitudinal centerline and a lateral direction, wherein the gas turbine engine of the first propulsion system is mounted to the port side and the gas turbine engine of the second propulsion system is mounted to the starboard side, wherein the gas turbine engines of the first and second propulsion systems are spaced substantially equally from the longitudinal centerline along the lateral direction, wherein the auxiliary propulsor assembly of the first propulsion system is mounted to the starboard side and the auxiliary propulsor assembly of the second propulsion system is mounted to the port side, wherein the auxiliary propulsor assemblies of the first and second propulsion systems are each positioned outward of the gas turbine engines and spaced substantially equally from the longitudinal centerline along the lateral direction.

17. The aircraft of claim 14, further comprising: a wing assembly comprising a port side and a starboard side; wherein the gas turbine engine and auxiliary propulsor assembly of the first propulsion system are each mounted to the port side of the wing assembly; and wherein the gas turbine engine and auxiliary propulsor assembly of the second propulsion system are each mounted to the starboard side of the wing assembly.

18. The aircraft of claim 14, wherein the auxiliary propulsor assembly of the first propulsion system and the auxiliary propulsor assembly of the second propulsion system each comprise an electric motor, wherein the electric motors are each in electrical communication with the respective electric generators and drive the respective auxiliary fans.

19. The aircraft of claim 14, wherein the auxiliary propulsor assembly comprises an auxiliary fan, and wherein the auxiliary fan defines a fan pressure ratio during cruise operations less than about 1.4:1.

20. A method for operating a propulsion system for an aircraft, the propulsion system comprising a gas turbine engine, an electric generator, and an auxiliary propulsor assembly, the gas turbine engine drivingly connected to the electric generator and the electric generator electrically coupled to the auxiliary propulsor assembly for driving the auxiliary propulsor assembly, the method comprising:

operating the gas turbine engine in a takeoff operating mode such that a turbomachine of the gas turbine engine defines a first overall pressure ratio and provides the auxiliary propulsor assembly with a first amount of electric power through the electric generator; and operating the gas turbine engine in a cruise operating mode such that the turbomachine of the gas turbine engine defines a second overall pressure ratio and provides the auxiliary propulsor assembly with a second amount of electric power through the electric generator, the second overall pressure ratio being greater than the first overall pressure ratio;

wherein operating the gas turbine engine in the takeoff operating mode includes operating the propulsion system to define a first fraction of power extraction, wherein operating the gas turbine engine in the cruise operating mode includes operating the propulsion system to define a second fraction of power extraction, wherein the fraction of power extraction refers to a ratio of power provided to the auxiliary propulsor assembly from the turbomachine to an overall amount of power generated by the turbomachine, and wherein the first fraction of power extraction is less than the second fraction of power extraction.

21. The method of claim 20, wherein the auxiliary propulsor assembly comprises an auxiliary fan, and wherein operating the gas turbine engine in a cruise operating mode includes operating the propulsion system such that the auxiliary fan defines a fan pressure ratio during cruise operations less than about 1.4:1.

\* \* \* \* \*